United States Patent [19]

Berkman

[11] 4,411,481
[45] Oct. 25, 1983

[54] HOLDER FOR AUDIO/VIDEO CASSETTES, GAMES CARTRIDGES AND STORAGE CASES

[76] Inventor: Joseph L. Berkman, 48 Country Rd., Mamaroneck, N.Y. 10543

[21] Appl. No.: 332,974

[22] Filed: Dec. 21, 1981

[51] Int. Cl.³ .................................................. A47B 81/06
[52] U.S. Cl. ........................................ 312/8; 312/10; 312/12; 206/387
[58] Field of Search ................... 312/8–12, 312/183, 205; 206/387

[56] References Cited

U.S. PATENT DOCUMENTS

| | | | |
|---|---|---|---|
| 3,353,885 | 11/1967 | Hanson | 312/205 |
| 3,889,817 | 6/1975 | Berkman | 211/163 |
| 4,117,931 | 10/1978 | Berkman | 206/564 |
| 4,231,973 | 11/1980 | Aprahamian | 206/387 |
| 4,239,306 | 12/1980 | Klaus | 312/259 X |
| 4,266,834 | 5/1981 | Ackeret | 312/183 X |
| 4,293,075 | 10/1981 | Veralrud | 206/387 |

FOREIGN PATENT DOCUMENTS 7709480  8/1977  Netherlands ...................... 206/387

*Primary Examiner*—Victor N. Sakran
*Assistant Examiner*—Joseph Falk
*Attorney, Agent, or Firm*—Lackenbach, Siegel, Marzullo, Presta & Aronson

[57] ABSTRACT

This invention relates generally to storage devices, and more particularly to a holder having a plurality of tandem storage compartments or bins each of which can securely hold and store many differently-sized audio/video cassettes and game cartridges, as well as their soft and hard enclosures or storage cases.

21 Claims, 22 Drawing Figures

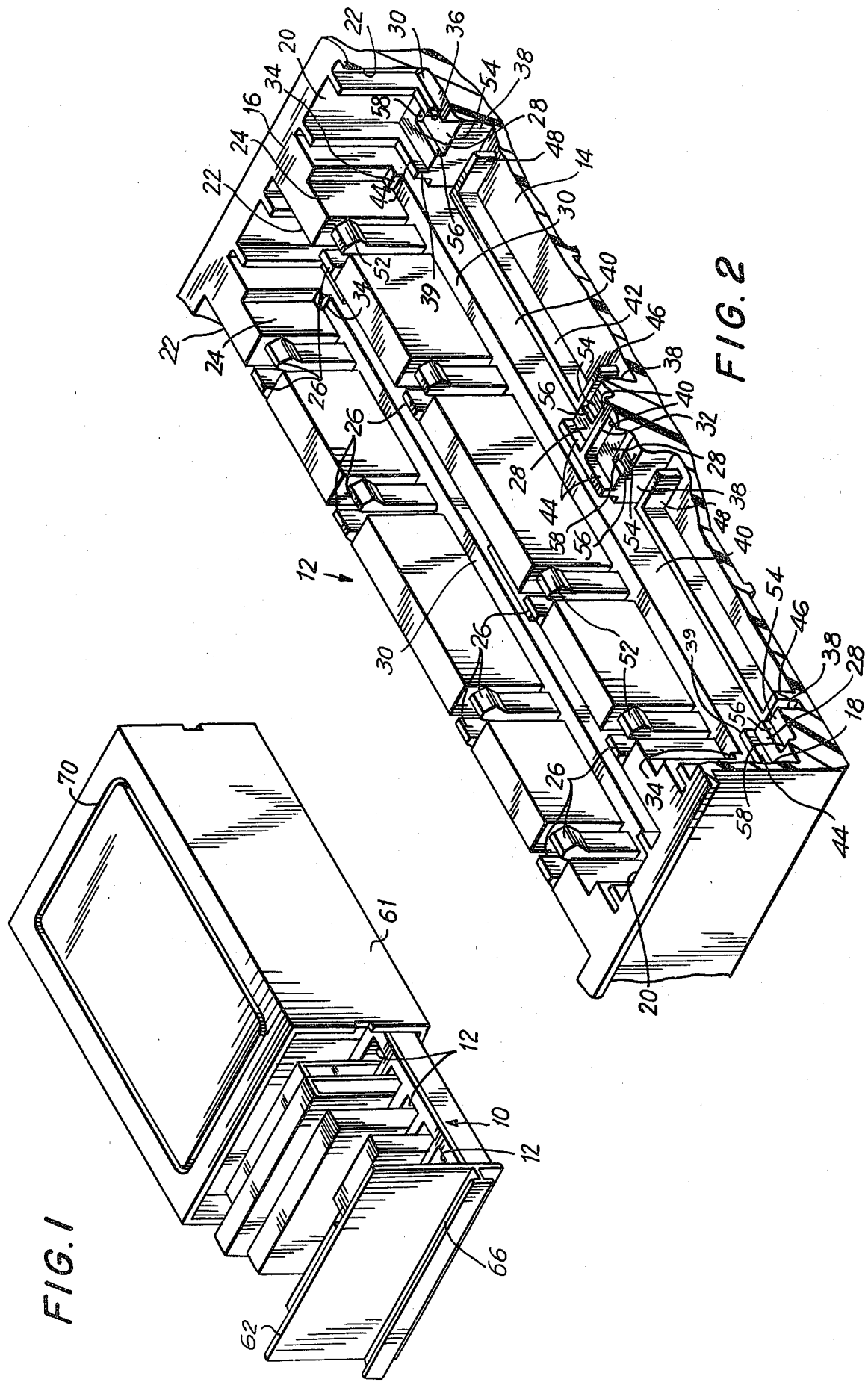

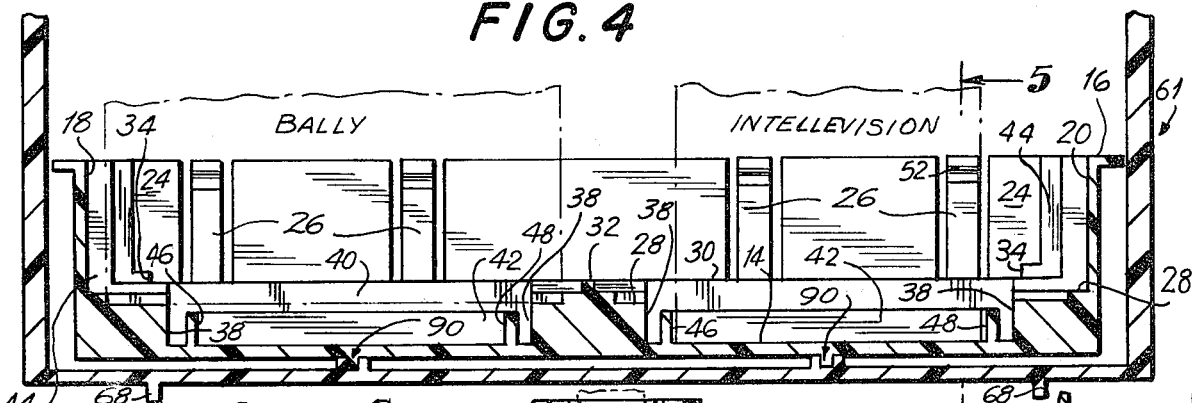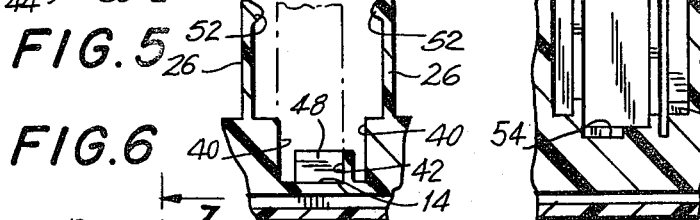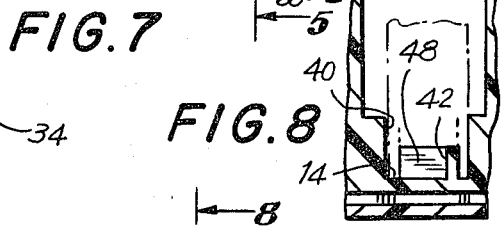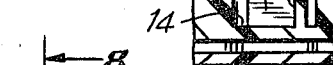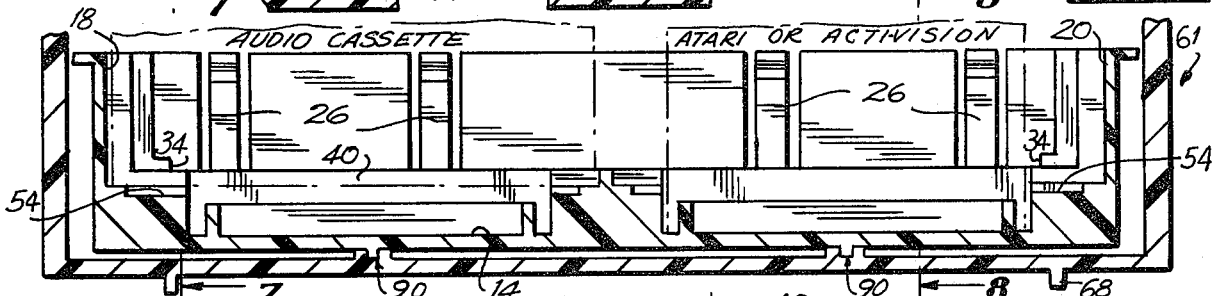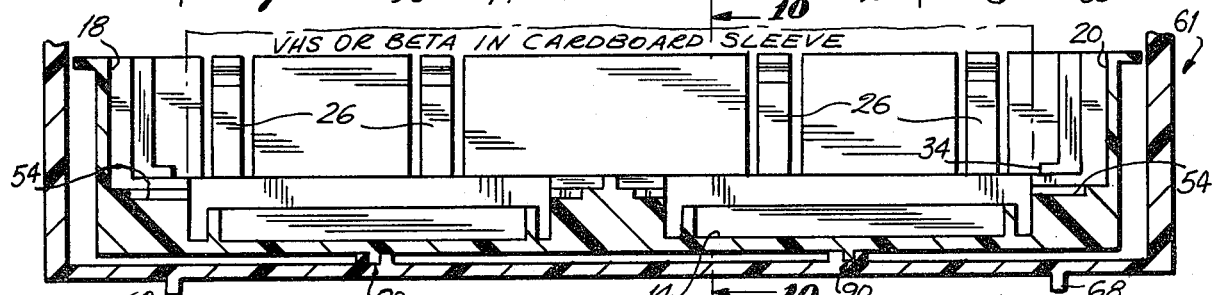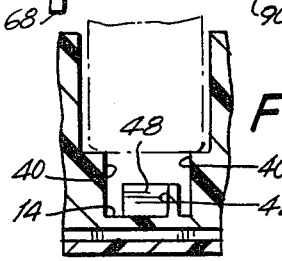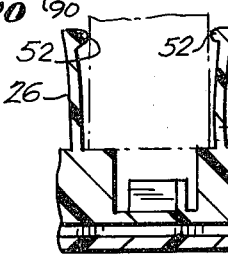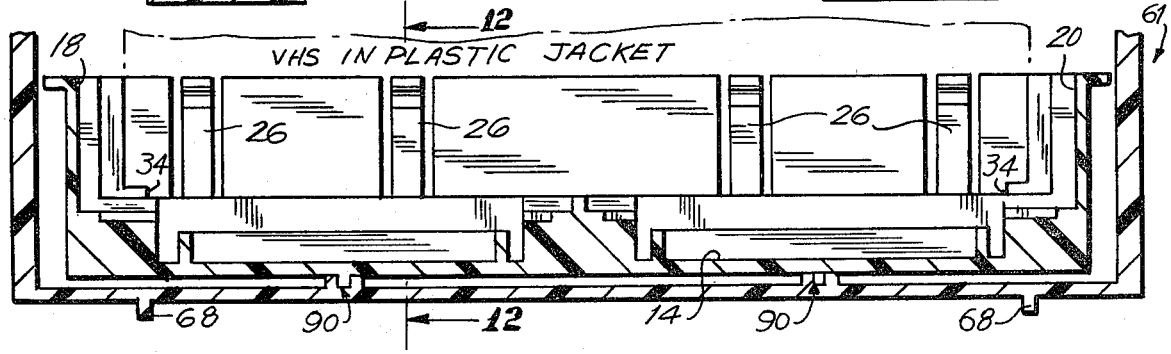

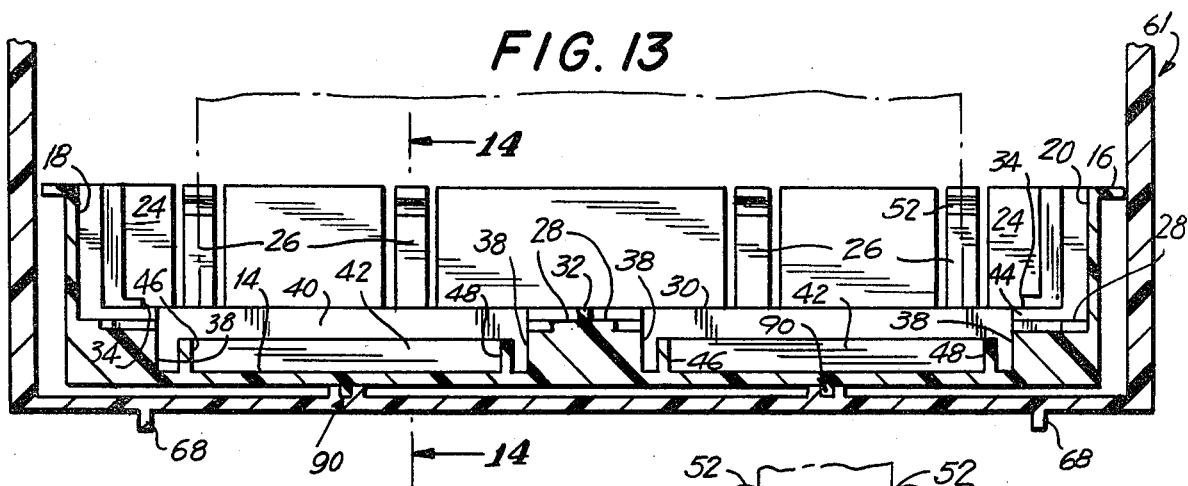
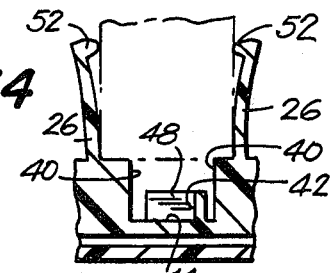
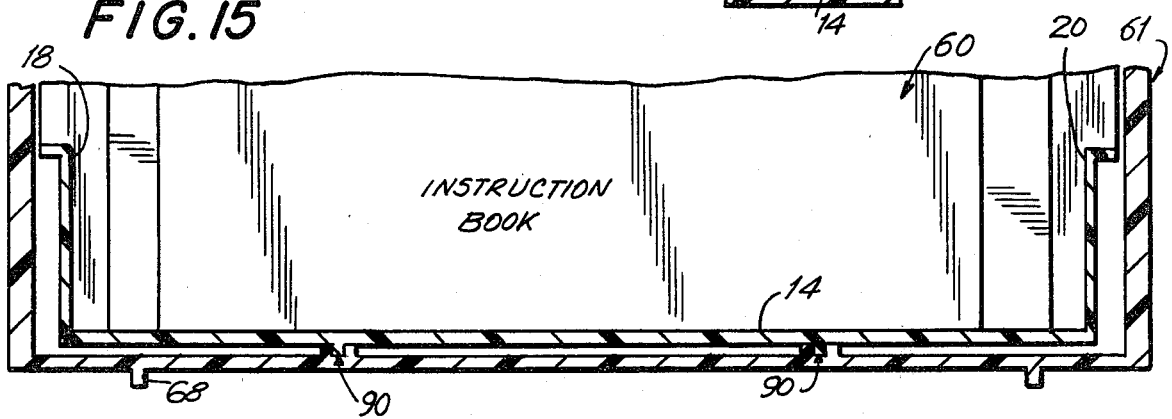
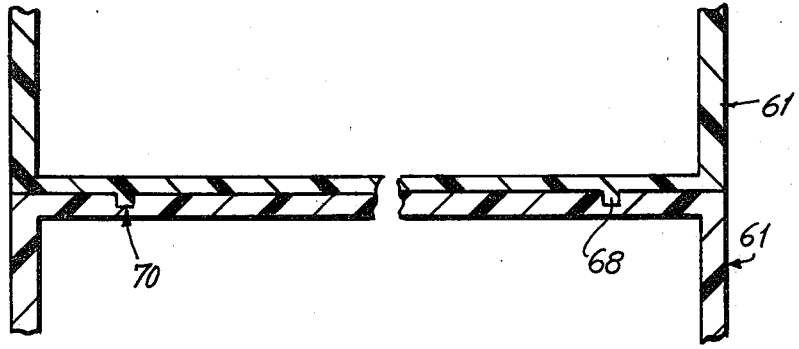
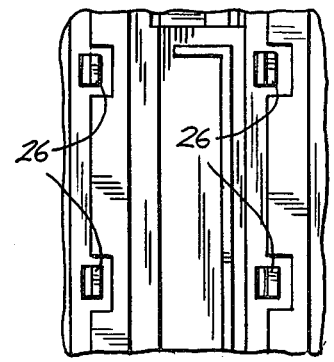

HOLDER FOR AUDIO/VIDEO CASSETTES, GAMES CARTRIDGES AND STORAGE CASES

BACKGROUND OF THE INVENTION

Numerous storage devices are known, such as U.S. Pat. Nos. 3,889,817 and 4,003,468 which disclose cases or devices having compartments or bins, each of which are adapted to interchangeably receive and store either a standard 8-track magnetic audio cartridge or a magnetic audio cassette enclosure. Other United States patents, such as U.S. Pat. Nos. 3,907,116 and 3,736,036 employ separately styled compartments or shelves for storing boxed audio cassettes in one of the styled shelves or compartments and unboxed audio cassettes in the other styled shelves or compartments.

Yet another storage unit (U.S. Pat. No. 257,496) known as the X-14 manufactured by the Service Manufacturing Co., Inc.) receives and stores in different positions of a single compartment one or the other of the conventional and widely marketed recorder formats, known as the Beta and the VHS configurations of video cassettes. Beta being Sony's entry into the video cassette market and Zenith Corporation and Sears & Company also market Beta video cassettes. The VHS configuration is slightly wider and is a longer video cassette than the Beta configuration. It is marketed under the Panasonic mark by the Matsushita Electric Industrial Co., Ltd. of Osaka, Japan, and the RCA Company markets video cassettes under this configuration. Beta and VHS being the only known formats currently employed for use in video cassette recorders sold to the public.

Another prior art storage device also manufactured by Service Manufacturing Co., Inc. marketed under VC-14/15 and VC-28/30 are respectively capable of receiving and storing in different compartments 14 VHS or 15 Beta cassettes, and 28 VHS or 30 Beta cassettes. This device, however, employs removable elements for setting up alternate compartments which are transversely disposed relative to a first set of compartments for one of the video cassettes.

Still another storage device marketed under the trademark "Cassette's Game" file by Innovative Concepts Inc. of San Jose, Calif. 95131, employs one style compartment for holding and storing boxed audio cassettes and a differently-styled compartment for holding and storing any one of a number of video game cartridges, such as an Atari game cartridge or an Intellevision game cartridge, etc.

However, none of the known tape storage devices, whether they are of the type for audio enclosures or of the type for video enclosures, are capable of receiving and storing in a single compartment or bin one video cassette with or without its protective cardboard sleeve or plastic jacket or two boxed audio cassettes or two T.V. game cartridges. As all of the known storage devices are limited in receiving only one or two of the aforementioned magnetic tape enclosures, it has been necessary for an audio/video fan in the past to acquire a plurality of different storage devices to hold and store the many different types of magnetic tape enclosures available in the today's audio/video industry. Such a requirement results in unnecessary inconvenience and expense and also requires considerable space in one's apartment or room to place the many different type of storage cases one would need to hold and store a large and varied collection of magnetic tape enclosures, including but not limited to the following: audio cassette enclosures, video cassettes of the Beta and VHS configurations, protective video (cardboard) sleeves or jackets and/or protective plastic cases, such as for the Beta and VHS configurations of video tape cassettes, and video game cartridges, such as Atari, Intevellevision, Bally, Magnavox and Acti Vision.

SUMMARY OF THE INVENTION

Accordingly, it is a principal object of the present invention to provide an improved storage device for holding and storing substantially any type of audio/video magnetic tape enclosure, and the T.V. game cartridges.

Another object of the invention in its broadest application is to provide a storage device which in a single compartment or bin is capable of receiving and storing either one video cassette in a boxed or unboxed condition and two T.V. game cartridges of the same or different configurations.

Yet a further object of the invention is to provide a storage case or holder which is relatively simple in construction and one which is capable of economical manufacture.

It is yet still a further object of the invention to provide a holder or storage device which includes a plurality of storage compartments or bins each of which can securely hold one unboxed video cassette as well as its enclosure or storage case, or two boxed audio cassettes or two T.V. game cartridges.

The storage unit or holder in accordance with the present invention comprises a tray having at least one bin, and preferably a plurality of bins for video cassettes, and video game cartridges, and wherein the bins are capable of interchangeably receiving and storing differently-sized video cassettes and differently-sized video game cartridges. Each bin is of generally rectangular configuration and is generally bounded by a bottom wall (14), side walls (22 and 24) and end walls (20). At least one of the side walls having a plurality of resilient fingers (26), preferably with protuberances (52) at their distal ends extending into said bins. Another bottom wall (30) above said bottom wall (14) and on both sides of each bin transversely extends substantially for the width of said bin, and terminates generally at second end walls (34) extending upwardly from said another bottom wall (30). Additional side walls (40) extending from said bottom wall (14) to said another bottom wall; and additional end walls (38) extending from said bottom wall (14) to further bottom walls (28) and being disposed between said bottom wall (14) and said another bottom wall (30); and pairs of channel shaped guides (42, 46 and 48) extend upwardly from said bottom wall (14) between said additional end walls; wherein each said bin can hold on said bottom wall one video cassette of either Beta or VHS configuration, or a Beta or VHS cassette in either a plastic box or in a cardboard sleeve, or two different video game cartridges on said bottom wall.

The present invention thus will be better understood and the main objects and important features, other than those specifically enumerated above will become apparent when consideration is given to the following details and description, which when taken in conjunction with the annexed drawings, describes, discloses, illustrates and shows the preferred embodiments or modifications of the present invention and what is presently considered and believed to be the best mode of practice in the principles thereof. Other embodiments or modifications may be suggested to those having the benefit of the teachings herein and such other embodiments or modifications are intended to be reserved especially as they fall within the scope and spirit of the subjoined claims.

BRIEF DESCRIPTION OF THE DRAWINGS

FIG. 1 is a perspective view of a holder or storage device for audio/video cassettes and game cartridges as well as their enclosures or storage cases, the holder or device being in the form of a drawer for a cabinet or case, and showing holding therein in the identically styled compartments or bins a number of audio/video cassettes and T.V. game cartridges and their enclosures or storge cases;

FIG. 2 is a fragmentary, perspective view of a typical compartment or bin, and showing in greater detail the various shelf and/or wall means for receiving and storing differently-sized audio/video cassettes and magnetic T.V. game cartridges and their enclosures or storage cases;

FIG. 4 is a cross-sectional view, generally taken along the line 4—4 of FIG. 3;

FIG. 5 is a cross-sectional view, generally taken along the line 5—5 of FIG. 4;

FIG. 6 is a cross-sectional view, generally taken along the line 6—6 of FIG. 3;

FIG. 7 is a cross-sectional view, generally taken along line 7—7 of FIG. 6;

FIG. 8 is a cross-sectional view, generally taken along the line 8—8 of FIG. 6;

FIG. 9 is a cross-sectional view, generally taken along the line 9—9 of FIG. 3;

FIG. 10 is a cross-sectional view, generally taken along the line 10—10 of FIG. 9;

FIG. 11 is a cross-sectional view, generally taken along the line 11—11 of FIG. 3;

FIG. 12 is a cross-sectional view, generally taken along the line 12—12 of FIG. 11;

FIG. 13 is a cross-sectional view, generally taken along the line 13—13 of FIG. 3;

FIG. 14 is a cross-sectional view, generally taken along the line 14—14 of FIG. 13;

FIG. 15 is a cross-sectional view, generally taken along the line 15—15 of FIG. 3;

FIG. 16 is a fragmentary sectional view, showing the stacking feature of the storage devices of the present invention;

FIG. 17 is another fragmentary view, but showing a drawer of the present inventive storage device with compartments oriented longitudinally in lieu of transversely;

FIG. 18 is a fragmentary view of an alternate compartment or bin for a drawer wherein spring fingers are provided along just a single wall surface rather than on opposite wall surfaces or sides of a compartment or bin;

DESCRIPTION OF THE PREFERRED EMBODIMENT

Figure 3:
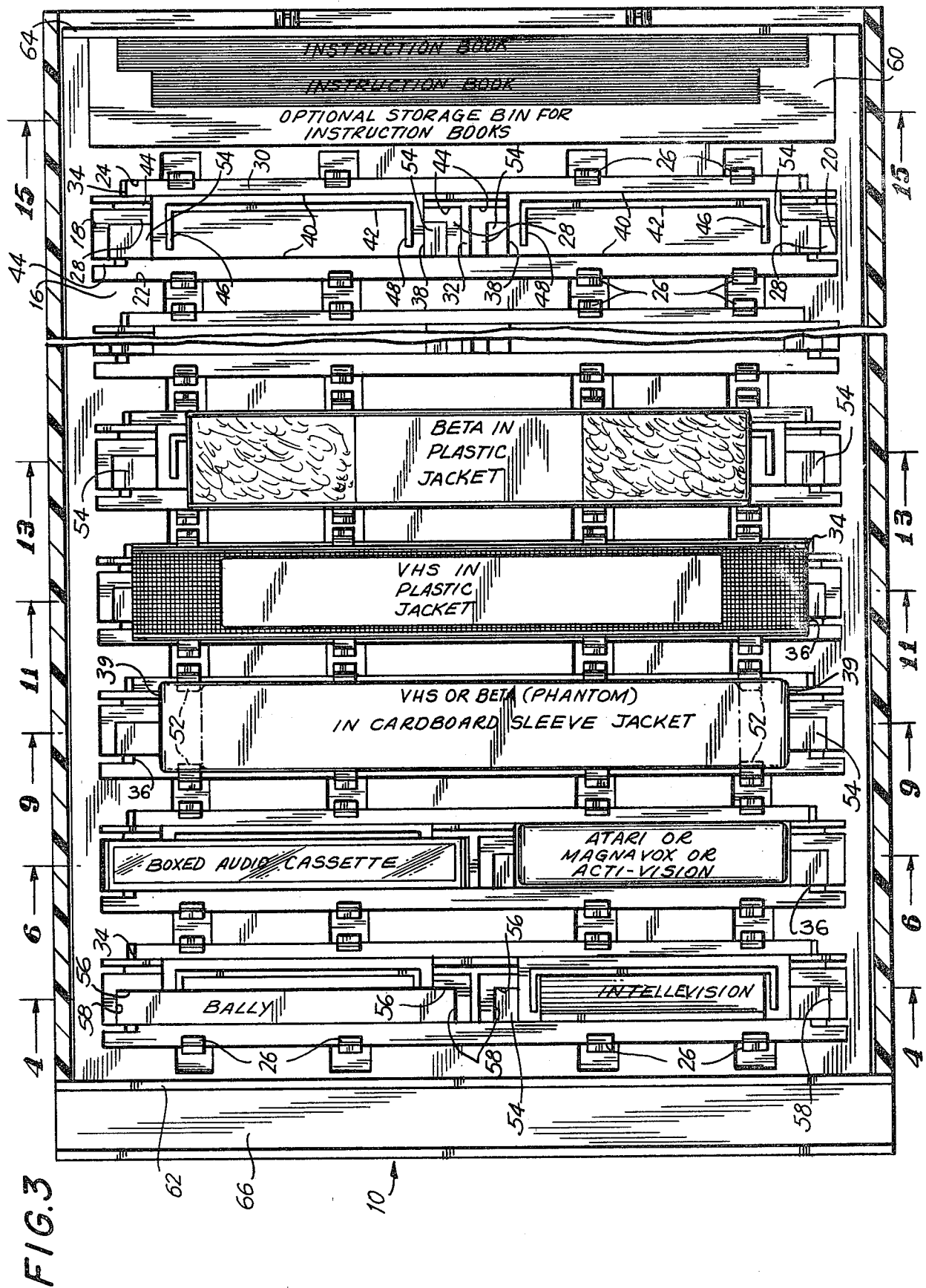
FIG. 3 is a plan view, partly broken away, of the drawer shown in FIG. 1, and illustrating therein seven audio/video cassettes and magnetic T.V. game cartridges and their enclosures or storage cases.

Referring now to the drawings, and in particular to FIGS. 1-3, in which identical or similar parts are designated by the same reference numerals throughout, the holder or storage device is in the form of a drawer in accordance with the present invention and is generally designated by the reference number 10.

The drawer 10 has or is provided with at least one compartment or bin 12, and preferably eight tandem or adjacent bins, and each bin generally has a bottom wall 14, a top wall 16, and end walls 18 and 20. Side or front and rear walls 22 and 24 generally form the remaining walls which provide the overall rectangular structure to each bin form. Within at least one side wall (22 or 24), and as best shown in FIG. 18, are a plurality of upstanding resilient fingers 26. Preferably four fingers 26 are employed, although three fingers could also be employed. The function of the vertical fingers will be explained hereinafter in greater detail. Optimally, both side walls 22 and 24 may embody such upstanding resilient fingers 26, as is best shown in FIG. 3.

Each compartment or bin 12 is also provided with a second bottom wall 28 comprising spaced apart walls and a third bottom wall 30 comprising spaced apart walls and a central divider wall 32 separating the second bottom wall 28 into a pair of "half" compartments or bins disposed in end-to-end fashion for the full transverse width of the bins 12 with each said "half" compartments or bins holding a boxed audio cassette enclosure or within same a game cartridge.

Each compartment or bin 12 is further provided with second end walls 34 comprising spaced apart walls, third end walls 36 comprising spaced apart walls, and fourth end walls 38 comprising spaced apart walls.

The central divider wall 32 in a sense splits each compartment or bin 12 into identical right and left halves as noted hereinabove; and each compartment or bin 12 is also provided with intermediate side walls such as the pair of side walls 40, side wall 42, and the side walls 44. Wall 39 which is an end of wall 44 and an extension of end walls 39, may, if desired, be employed as an end stop for a VHS video cassette, packaged in a cardboard sleeve jacket.

Extending up from the bottom wall 14 are a plurality of short upstanding walls comprising preferably a pair of end walls or guides 46 and 48, and the intermediate side wall 42 which also acts as a wall guide extending between end walls 46 and 48, which three together defines a space along with the bottom wall 14 and one of the intermediate side walls 40 for receiving and holding an Intellevision video cartridge, as is best shown in FIG. 3, such as those made and sold by Mattel, Inc. of Los Angeles, Calif. Although two channel shape guide walls are shown, of course, one may be employed in either half bin.

The bottom wall 14 and the intermediate side walls 40 and 42, as well as the end walls 38, together define a space for receiving and storing or holding either an Atari or a Magnavox, or an Acti Vision video games cartridge, as is also best shown in FIG. 3.

The resilient fingers 26 extend preferably upwardly from the third bottom walls 30 and comprise a nub or protrusion 52 at their distal ends for gripping along the sides of the various video cassettes and/or enclosures and for acting as an end limit stop for the Beta configuration of video cassette when packaged in a cardboard sleeve or jacket, as shown in phantom in bin 12 (third up from front of drawer 10 in FIG. 3).

The various audio/video cassettes and game cartridges and their enclosures or storage cases are received and stored or held in each compartment or bin by means of the following recited walls and/or guides. These surfaces define the boundaries by which each magnetic tape enclosure (which incidentally are all generally rectangular in shape) is securely retained in place in the drawer or holding device of the present invention.

For a magnetic tape audio cassette enclosure or boxed audio cassette, the wall boundaries forming its own "compartment or bin" within the bin 12 comprise first bottom walls 28, an end wall 18 or 20, the central divider wall 32, and the intermediate side walls 44.

For the video game cartridges, such as Atari, Magnavox or Acti Vision, the wall boundaries forming its own "compartment or bin" within the bin 12 comprise the bottom wall 14, the intermediate side walls 38 and the side walls 40.

For the Mattel's "Intellevision" video game cartridge, the wall boundaries forming its own "compartment or bin" within the bin 12 comprise the bottom wall 14, intermediate walls 40 and 42, and end walls 46 and 48. The end guide walls 40 and 42 and the intermediate side wall 42 can, of course, be reversed in place so the open side of the channel-shaped walls face opposite the handle means 66.

For the Beta video cassette (with or without its protective cardboard sleeve jacket), the wall boundaries forming its own "compartment or bin" within bin 12 comprise third bottom walls 30, resilient fingers 26 and the nubs or protrusions 52 of the outermost resilient fingers 26 which act as end limit stops if the Beta video cassette is positioned in the center of its bin.

For the VHS video cassette (with or without its protective cardboard sleeve jacket), the wall boundaries forming its own "compartment or bin" within the bin 12 comprise third bottom walls 30, end walls 39, and the resilient fingers 26, and if desired, the end wall 39. The engaging segment of end wall 39 may be common with the end wall 38 as is best shown in FIG. 2.

For the Beta video hard plastic storage case, the wall boundaries forming its own "compartment or bin" within the bin 12 comprise third bottom walls 30 and the resilient gripping fingers 26.

For the VHS video hard plastic storage case, the wall boundaries forming its own "compartment or bin" within the bin 12 comprises third bottom walls 30, the resilient fingers 26, and the end walls 34. For the Bally video game cartridge, the wall boundaries forming its own "compartment or bin" within the bin 12 comprise fourth bottom walls 54, side wall 40, side walls 56 (which is parallel to side wall 40), and end walls 58. Of course, it is possible to seat a Bally cartridge with no end wall 58 on one side of the "half-bin".

Thus, all of the twelve different configurations (actually only eight magnetic tape formats, but twelve variations including all forms of packaging) can be received and securely stored in place in any one compartment or bin 12 of the drawer or holder of the present invention, with each compartment or bin 12 capable of storing two of the same or different video game cartridges or boxed audio cassettes; or one video cartridge.

The drawer or storage container structure is also, if desired, suitably provided with another singular compartment or bin 60 for storing instruction booklets, such as those normally associated with the various video game cartridges. The bin 60 may be conveniently placed at either end of the drawer 10, and is optional.

It should also be recognized that the drawer may comprise one or more compartments or bins, and it can be suitably molded from a plastic material. In the preferred example of the invention, the storage device is in the form of a drawer which is mated with and cooperatively associates with a case 61. The drawer is thus covered and protected from dust when closed. Suitable front and rear panels 62 and 64 are secured to the drawer or tray for completely enclosing the drawer or tray when it is mated with its case. Of course, the drawer may also be suitable equipped with a handle 66 to facilitate pulling and pushing of the drawer 10 in and out of the case.

The single row drawer 10 of the invention thus is capable of holding 8 video tape cassettes, of either Beta or VHS configurations (or mixed group), with or without cardboard sleeve jackets or plastic cases; or 16 boxed audio cassettes; or 16 of any of the aforementioned video game cassettes or any combination of the above.

Figure 19:
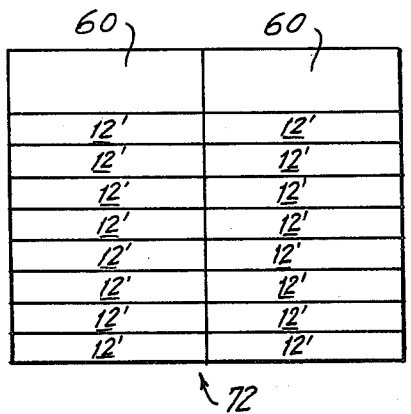
FIG. 19 is a diagramatic representation of a drawer or holding device embodying two rows of compartments or bins.
Figure 20:
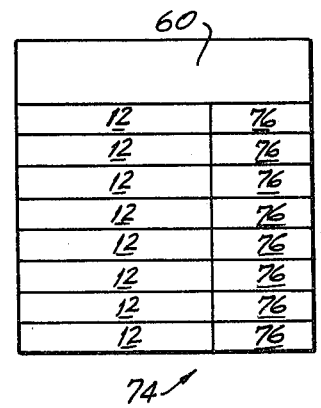
FIG. 20 is another diagramatic representation of a drawer or holding device embodying one row of compartments or bins of a full size and one row of compartments or bins of a half size construction for just the boxed audio cassettes or T.V. game cartridge.

FIG. 19 illustrates diagramatically an integral two row drawer 72 with bins 12' just like the bins 12 of the enbodiment of FIGS. 1–18. In a similar view, FIG. 20 shows a hybrid drawer 74 having bins 12 of FIGS. 1–18 and "half-bin" (76) just as if bin 12 was cut in half along the centerline of divider wall 32. Thus, this drawer 74 can hold all that the drawer of FIGS. 1–18 can hold, plus eight additional boxed audio cassettes or a combination thereof.

Figure 21:
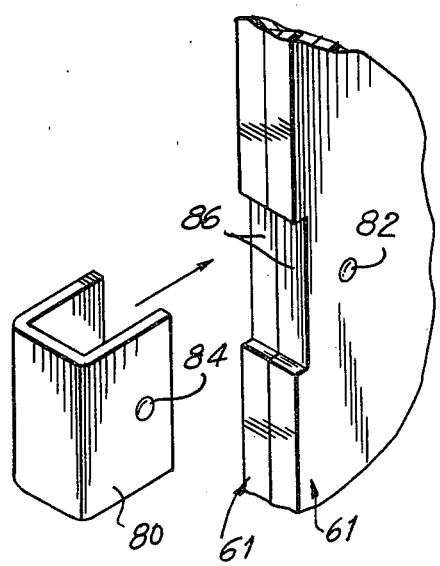
FIG. 21 is a fragmentary view of adjacent side panels of side-by-side covers or cases for a pair of drawers held together by front and rear clip-like elements so as to in effect provide a two-row drawer.
Figure 22:
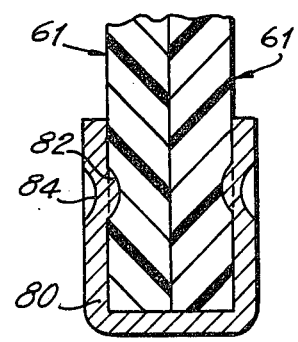
FIG. 22 is a cross-sectional view through the clip-like element and side panels shown in FIG. 21.

In FIGS. 21 and 22, a two row storage unit is shown, but not integrally made. As shown therein, the vertical side walls of a pair of cases 61 are held together by clip-like elements 80 at the front and rear ends (only one shown). The clip-like elements 80 and the vertical side walls are provided with mutally cooperative detent means, such as, for example, a tit 82 and a depression 84 for locking the two cases together. Other well-known and conventional means may be employed to hold the cases together as a unit. The cases 61 may be suitably notched, as at 86, and along the sides of the side walls, if necessary (not shown) to provide whatever clearance is required for the drawers 10 to move completely into and out of the cases 61 without any interference whatsoever.

It should also be noted that below the third bottom walls 30 reside all of the other bottom walls (bottom 14, second bottom walls 28, and fourth bottom walls 54) so that such other walls do not interfere with the Beta and VHS video cassettes. Even the side walls 44 are out of the way of the video cassettes since they are between the wall 34 and the end walls 18 or 20. In addition, the drawer 10 is suitably guided within the case 61 by means of mating tongue and groove tracks 90.

The case may also be preferably equipped with a suitable tongue 68 and groove 70 for nesting with other like cases one atop the other to facilitate stacking and storage of a multiplicity of storage cases of the invention, the tongue 68 being at the base of the case 61 and the mating groove at the top of the case 61.

In summary, each bin of the holder of the invention can interchangeably receive and hold either an unboxed Beta cassette, plastic boxed Beta, cardboard boxed Beta; an unboxed VHS cassette, plastic boxed VHS, cardboard boxed VHS; or any combination of two boxed audio cassettes, Atari, Magnavox, Bally, Intellevision or Acti Vision T.V. game cartridges.

In addition, although the scale is reduced in the drawings, the various sizes of the cassettes and cartridges are relatively in proportion to that of the case.

Although the embodiments illustrated in the drawings and described herein demonstrate several design variations and modifications possible within the framework of the invention, it will be apparent to those skilled in the art that other alternate constructions or modifications may be resorted to and made by one having ordinary skill in the art without necessarily departing from the spirit and scope of this invention.

I claim:

1. A storage unit or holder having at least one bin for video cassettes and video game cartridges, wherein the bin is capable of interchangeably receiving and storing differently sized video cassettes and differently sized video game cartridges; each bin comprising a generally rectangular configuration and is generally bounded by a bottom wall, side walls, and end walls; at least one of the side walls having a plurality of resilient fingers for holding said video cassettes; another bottom wall above said bottom wall and on both sides of each bin transversely extending substantially for the width of said bin, and terminates generally at second end walls extending upwardly from said another bottom wall; additional side walls extending from said bottom wall to said another bottom wall; additional end walls extending from said bottom wall to further bottom walls and being disposed between said bottom wall and said another bottom wall; and at least one channel shaped guide extending upwardly from said bottom wall between said additional end walls; additional bottom walls between said bottom wall and said further bottom walls; secondary side walls and at least two fourth end walls extending between said additional botton walls and said further bottom walls; wherein each bin can hold on said another bottom wall one video cassette of either Beta or VHS configuration, or two video game cartridges on said bottom wall of either the same or different configuration.

2. The storage unit or holder according to claim 1, including a further side wall parallel to said additional side walls, and a central divider wall perpendicular thereto, and forming two half bins within a bin for storing two boxed audio cassettes on said further bottom walls between said end walls and said central divider wall andbetween said further side wall and one of said additional side walls.

3. The storage unit or holder according to claim 1, wherein some of said video game cartridges are retained in place between said additional side walls and said additional end walls.

4. The storage unit or holder according to claim 1, wherein the other of said video game cartridges are retained in place between a said channel shaped guide and one of said additional side walls.

5. The storage unit or holder according to claim 1, wherein said resilient fingers retain in place all said video cassettes in either an unboxed, boxed or sleeve jacket condition.

6. The storage unit or holder according to claim 5, wherein all of said resilient fingers are provided with protuberances at their distal ends.

7. The storage unit or holder according to claim 6, wherein at least one of the protuberances on the outermost resilient fingers serve as transverse limit stop for a Beta video cassette seated on said another bottom wall.

8. The storage unit or holder according to claim 1, wherein said third end walls restrict the transverse movement in said bin of a VHS video cassette.

9. The storage unit or holder according to claim 1, wherein said second end walls restrict the transverse movement in said bin of a VHS video cartridge packaged in a plastic jacket.

10. The storage unit or holder according to claim 2, including four fourth end walls between said additional bottom walls and said further bottom walls and wherein said two half bins interchangeably receive either said boxed audio cassettes or said video game cartridges.

11. the storage unit or holder according to claim 10, wherein said fourth end walls restrict the transverse movement of a Bally video game cartridge.

12. The storage unit or holder according to claim 1, including a case for said storage unit or holder.

13. The storage unit or holder according to claim 12, wherein said holder comprises at least one drawer provided with front and rear panels, and said front panel having handle means.

14. The storage unit or holder according to claim 12, wherein said case is provided with matching tongue and grooves on its bottom and top surfaces, so that a plurality of dust cases can be stacked in a nested condition one atop another.

15. The storage unit or holder according to claim 1, wherein both of said side walls of each said bin is provided with a plurality of resilient fingers.

16. The storage unit or holder according to claim 13, wherein said storage unit or holder comprises two rows, each row having eight bins.

17. The storage unit or holder according to claim 16, wherein said rows are in a side by side fashion with said bins transversely disposed with respect to said case.

18. The storage unit or holder according to claim 17, wherein said rows are provided in said drawer.

19. the storage unit or holder according to claim 18, wherein said rows and said drawer are integral.

20. The storage unit or holder according to claim 18, wherein two cases in the form of tubular sleeves are employed and said cases are secured in a side by side fashion by means of clip-like elements for holding said cases together as an assembly with two drawers and each drawer having one row of bins.

21. The storage unit or holder according to claim 1, where said holder is provided with a plurality of bins.

* * * * *